United States Patent [19]

Röck et al.

[11] Patent Number: 4,505,610
[45] Date of Patent: Mar. 19, 1985

[54] JOINING DEVICE

[75] Inventors: Erich Röck, Höchst; Helmut Hollenstein, Dornbirn, both of Austria

[73] Assignee: Julius Blum Gesellschaft m.b.H., Höchst, Austria

[21] Appl. No.: 497,562

[22] Filed: May 24, 1983

[30] Foreign Application Priority Data

Jun. 11, 1982 [AT] Austria ............................... 2265/82

[51] Int. Cl.³ .............................................. B25G 3/00
[52] U.S. Cl. .................................... 403/231; 403/407
[58] Field of Search ................ 403/407, 231, 245, 246

[56] References Cited

U.S. PATENT DOCUMENTS 4,325,649 4/1982 Rock .................................. 403/407
4,341,485 7/1982 Appleby ............................ 403/231

FOREIGN PATENT DOCUMENTS 2358163 6/1974 Fed. Rep. of Germany ...... 403/231
1533252 11/1978 United Kingdom .

Primary Examiner—Andrew V. Kundrat
Attorney, Agent, or Firm—Wenderoth, Lind & Ponack

[57] ABSTRACT

A device for connecting two furniture parts includes a dowel casing which is insertable into a bore in the side face of one furniture part and a screw that is screwed into the front face of the other furniture part. The screw is held in the dowel casing by a holding member which is a clamping element. Opposite the holding member there are ribs on the inner wall of the dowel casing into which the head of the screw is pressed by the holding member.

7 Claims, 5 Drawing Figures

4,505,610

JOINING DEVICE

BACKGROUND AND FIELD OF THE INVENTION

The invention relates to a joining device for joining together at right angles two furniture parts, comprising a cylindrical dowel casing adapted to be inserted into a bore at the side face of one furniture part. The dowel casing has an aperture into which a screw screwed into the other furniture part is eccentrically insertable. The screw is fastenable to the dowel casing by means of a holding member pivotally mounted in the dowel casing. The dowel casing at its circumference is provided with clamping ribs.

DESCRIPTION OF THE PRIOR ART

Joining devices of this kind are preferably used for releasably joining two cabinet walls. The dowel casing is inserted at the edge of the side face of one cabinet wall, while the other pin-like joining member, which is a dowel or a screw, is inserted into the front side of the furniture wall to be joined. The joining device is usually eccentrically fixed in the dowel casing. This is due to the fact that there should be no projecting edges when the furniture parts have been joined. The eccentric arrangement in the dowel casing of an aperture receiving the joining device would make the dowel casing project on all sides and, hence, the respective furniture wall would project also.

When assembling the furniture parts, the dowel casing is driven into the side of the furniture part, and one joining device is screwed or pushed into the front side or edge of the other furniture part. The furniture parts then are placed together, the head of the joining device is inserted into the aperture in the dowel casing and is retained thereat by means of the holding member.

It has been found that stability is insufficient when a screw is used as a joining device and when only one side of the screw head is retained by the holding member.

It has been proposed to solve this problem by providing a projecting nose at the internal wall of the aperture of the dowel casing into which the screw head protrudes, the screw head engaging behind such nose in the mounted position.

This solution proved unsatisfactory in practice because the screw had to be exactly positioned with respect to its distance from the front face of the plate into which it was screwed to enable the nose to fulfil its function. If the screw head projected insufficiently the device often did not function at all because the screw laterally or superjacently rested against the nose. If the screw head projected too far into the dowel casing the nose did not function. It has to be noted that extraordinarily precise insertion of the screw with tolerances in the range of tenths of millimeters makes ecconomical mass production impossible.

SUMMARY OF THE INVENTION

It is, therefore, the object of the invention to provide a device for joining pieces of furniture of the above-mentioned kind which facilitates insertion of the screw into the dowel casing.

According to the invention this is achieved by providing the dowel casing adjacent the aperture receiving the screw and at its internal wall opposite the holding member, with at least one rib, extending in the direction of insertion of the dowel casing. In the mounted position the screw head of the screw is pressed into such rib, when the holding member is fastened.

As the dowel casing is, together with the rib or ribs, made of plastic material the ribs are resilient with respect to the screw head. When the joining device is opened again, which will generally not be the case, the rim of the screw head can be pressed against any point of the rib or ribs.

An embodiment of the invention provides two ribs advantageously arranged on opposite sides of a plane of symmetry extending through the screw and the holding member.

It is advantageous that the breadth of the rib or ribs is between 0.8 and 1.2 mm.

A further embodiment provides that the rib or ribs are triangular, when viewed from the side.

The screw head is advantageously conical. When it is cylindrical it is provided with an annular thickened portion.

BRIEF DESCRIPTION OF THE DRAWINGS

In the following the invention will be described in more detail with reference to the accompanying drawings, wherein.

DESCRIPTION OF THE PREFERRED EMBODIMENTS

Figure 1:
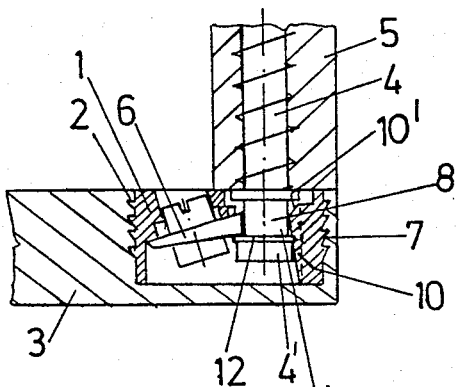
FIG. 1 is a sectional view of two furniture parts angularly joined by means of a joining device according to the invention.
Figure 2:
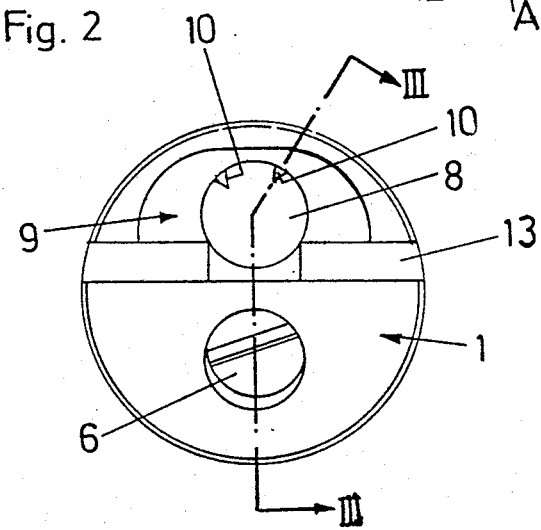
FIG. 2 is a top view of a dowel casing according to the invention.
Figure 3:
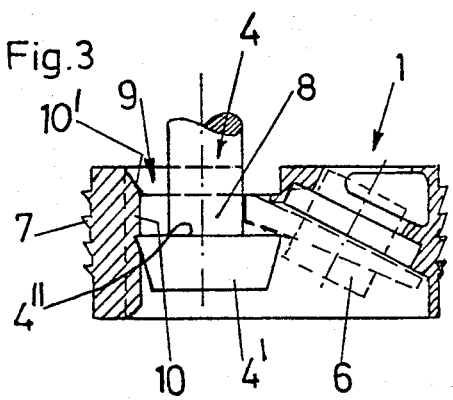
FIG. 3 is a view similar to FIG. 1 but of a second embodiment of the invention.

As can be seen in FIGS. 1 and 3, a dowel casing 1 according to the invention is inserted into a bore 2 at the edge of the side face of a furniture wall 3. A screw 4 is arranged at the front face of a corresponding furniture wall 5. When the piece of furniture is in the mounted condition, the dowel casing 1 and the screw 4 are linked by means of a holding member 6, the rotation of which causes wedging or clamping thereof against screw 4.

Figure 5:
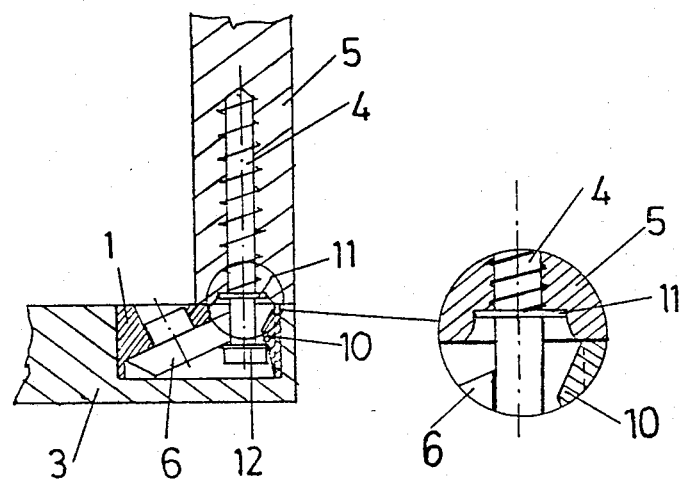
FIG. 5 is a sectional view of a furniture part, the screw being screwed into its front face.

As can be seen in FIG. 5, the screw 4 is provided with an annular disk 11 which can be pressed into the chip board of the wall 5 because of the soft material of such board so that there is no actual depth positioning of the screw 4.

To improve the fit of the dowel casing 1 in the respective furniture wall 3, the dowel casing is provided with circumferential clamping ribs 7.

When the dowel casing 1 is pressed into the furniture wall 3, particular care must be taken that an aperture 8 for receiving the screw 4 is exactly aligned with the position of the screw 4 in the mounted position. Only slight displacement of the dowel casing 1 would make a connection between the two furniture parts 3, 5 impossible.

When the dowel casing 1 is automatically inserted, it is aligned by means of a positioning groove 13.

Figure 4:
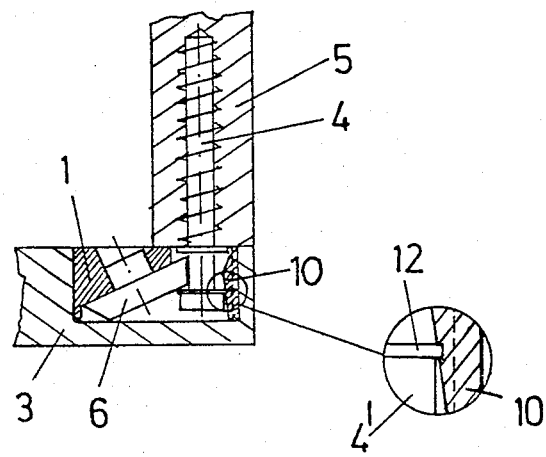
FIG. 4 is a view similar to FIG. 1, the portion in which the screw head is pressed into the ribs being shown enlarged.

Opposite the holding member 6 there are two ribs 10 provided along an internal wall 9 of the dowel casing 1 in the region of the aperture 8. When the holding member 6 is rotated and clamps against screw 4, then a portion of a head 4' of the screw is pressed into ribs 10. Thus, when the screw heas is frusto-conical as shown in FIG. 3, a rim 4" is pressed into ribs 10. When the screw head is cylindrical as shown in FIGS. 1 and 4, an annular thickened portion 12 is pressed into the ribs 10. Hence, the screw head 4' is retained in the dowel casing 1 at two opposite points. When viewed from the side, the ribs 10 are advantageously triangular. As shown particularly in FIG. 3, an upper inclined rim or edge 10' may be provided for guiding the insertion of head 4' of screw 4 into the dowel casing.

What is claimed is:

1. A device for connecting together at right angles two furniture parts, said device comprising:
    a dowel casing adapted to be inserted into a bore at a side face of one furniture part, said dowel casing having circumferentially outer clamping ribs;
    a screw adapted to be screwed into an edge of the other furniture part, said screw having a screw head;
    said dowel casing having an eccentrically positioned aperture receiving said screw head when the two furniture parts are in the respective positions to be connected together;
    holding means rotatably mounted in said dowel casing for clamping said screw within said dowel casing, and thereby connecting the furniture parts; and
    said dowel casing having, at an internal wall adjacent said aperture and opposite said holding means, rib means, extending in the direction of insertion of said dowel casing, for being pressed into by a portion of said screw head upon operation of said holding means for clamping said screw.

2. A device as claimed in claim 1, wherein said rib means comprise two parallel ribs.

3. A device as claimed in claim 2, wherein said two ribs are arranged on opposite sides of a plane of symmetry extending through respective axes of said screw and said holding means.

4. A device as claimed in claim 1, wherein said rib means comprises at least one rib having a width of from 0.8 to 1.2 mm.

5. A device as claimed in claim 1, wherein said rib means comprises at least one triangular shaped rib.

6. A device as claimed in claim 1, wherein said screw head is of frusto-conical configuration, and said portion of said screw head comprises a large diameter rim thereof.

7. A device as claimed in claim 1, wherein said screw head is of cylindrical configuration, and said portion of said screw head comprises an annular thickened portion thereof.

* * * * *